United States Patent [19]
Johnston

[11] Patent Number: 4,642,844
[45] Date of Patent: Feb. 17, 1987

[54] TROLLEY HANGER FOR SLIDING DOOR
[75] Inventor: James R. Johnston, Sterling, Ill.
[73] Assignee: National Manufacturing Co., Sterling, Ill.
[21] Appl. No.: 704,203
[22] Filed: Feb. 22, 1985
[51] Int. Cl.[4] ............................................ E05D 15/06
[52] U.S. Cl. .......................................... 16/98; 16/102; 105/155; 384/126
[58] Field of Search ........... 16/98, 102, 107, DIG. 27; 104/89, 94; 105/148, 155; 384/126

[56] References Cited
U.S. PATENT DOCUMENTS

| | | | |
|---|---|---|---|
| 591,235 | 10/1897 | Louden et al. | 16/98 X |
| 624,246 | 5/1899 | Prouty | 16/98 |
| 1,472,156 | 10/1923 | Davis | 16/98 |
| 2,151,590 | 3/1939 | Ferris | 16/98 |
| 3,793,673 | 2/1974 | Lawrence, Jr. | 16/98 X |
| 4,457,046 | 7/1984 | Vater | 16/98 X |

Primary Examiner—Fred Silverberg
Attorney, Agent, or Firm—Edmond T. Patnaude

[57] ABSTRACT

A trolley assembly including a channel shaped body and a pair of frictionless bearing assemblies which include a split tubular spring liner constituting the outer race of the bearing and the wheel axle extends through the space between a plurality of roller bearings positioned between the axle and the outer race. End spacers are secured between the trolley wheels and the body for controlling the end play of the roller bearings and of the trolley wheels.

2 Claims, 10 Drawing Figures

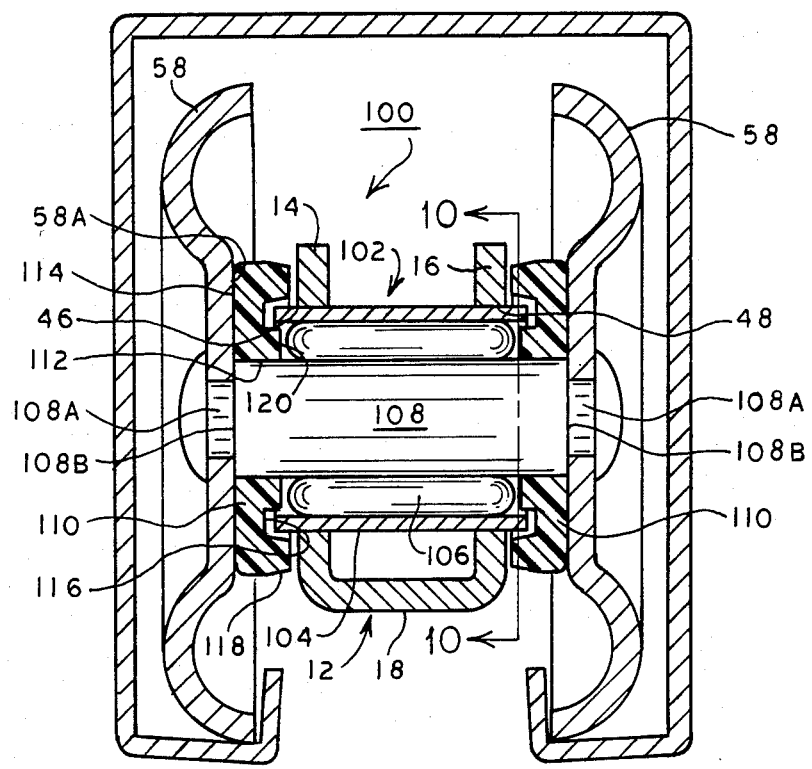
FIG. 8
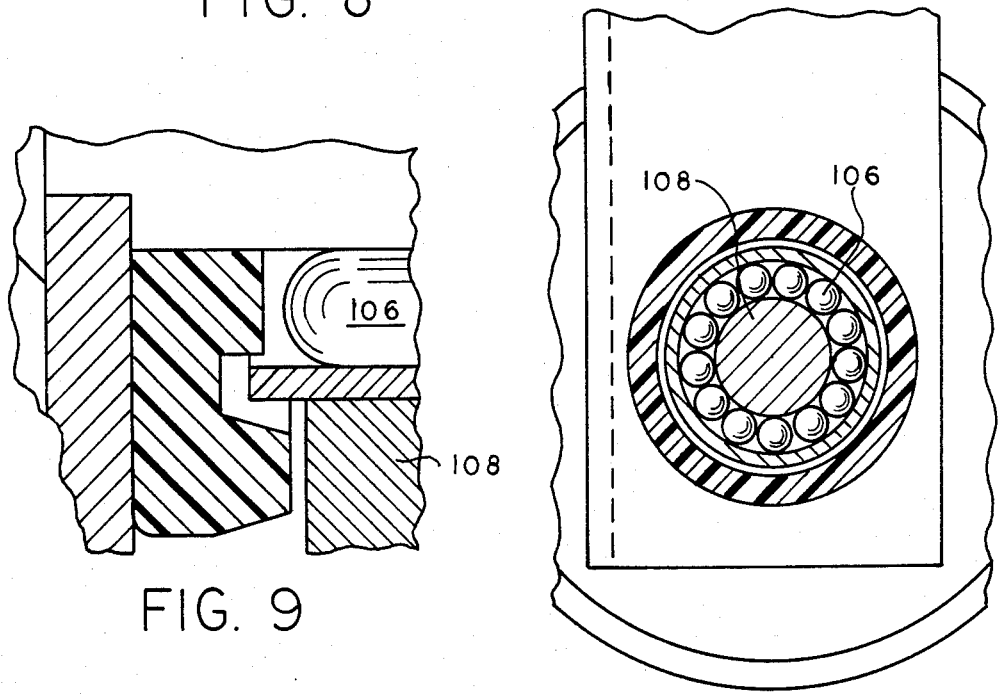
FIG. 9
FIG. 10

TROLLEY HANGER FOR SLIDING DOOR

BACKGROUND OF THE INVENTION

This invention relates to trolleys and more particularly to a trolley assembly for hanging a sliding door. Typically, large sliding doors are hung from overhead tracks by means of trolleys that include a plurality of wheels that are received in the tracks of an overhead rail and are totally journaled in a structural body from which the door is suspended by a hanger attached to the body and to the door.

There are several different types of trolleys which are respectively adapted for use in different applications. For example one type of trolley permits the associated door to be swung about a horizontal axis which extends parallel to the overhead rail and through the trolley. Other types permit lateral movement of the associated door by rotation of hangers having offset intermediate portions. Still other types are designed for use with very heavy or with relatively light doors.

In order to reduce the manufacturing cost of these various hangers it would be desirable to provide a novel body which is strong and durable in construction and which is usable with a large number of different types of trolley hangers.

The doors which are suspended from these trolleys are normally relatively large and are often very heavy, exerting large forces on the bearings of the trolley wheels makes it desirable to provide bearings having high load capacities. Also, due to these high loads, and especially in the case of very large doors, it would be desirable to provide a bearing having reduced friction so that the effort required to slide the door is reduced.

Heretofore, it has been common to rotatably journal the axle of the trolley wheels in a bushing sleeve that is retained in the body of the trolley. This prior art structure provides a relatively great rotational friction and has a relatively high wear rate resulting in short life or generally early degradation of performance. It can be appreciated that it would be highly desirable to provide a trolley having a high load capacity in combination with a generally frictionless bearing assembly that has long life and is easy to assemble during manufacture. It would also be desirable if such a trolley included a body which was adapted to be used in other types of trolleys where a greater amount of friction could be tolerated.

SUMMARY OF THE INVENTION

Briefly, in accordance with the present invention there is provided a new and improved door hanger trolley assembly including a unitary rigid channel member having a pair of upright side flanges and a connecting web at the bottom; a pair of bushings disposed in spaced apart, aligned openings in the side flanges; a pair of axles extending respectively through the pairs of bushings; and four trolley wheels secured respectively on the ends of the axles. A hanger bolt depends through a central opening in the web for attachment in the conventional manner to the top frame member of a door.

In a preferred embodiment of the invention each pair of bushings comprises an outer race in the form of a tubular spring retained in the aligned openings in the side flanges by a radial spring force and a plurality of roller bearings disposed between the outer race and the axle extending therethrough. A pair of end spacers disposed over the respective end portions of the axle retain the bearings in place and space the trolley wheels from the ends of the outer race to permit free rotation of the trolley wheels.

BRIEF DESCRIPTION OF THE DRAWINGS

The invention will be better understood after reading the following detailed description in connection with the accompanying drawings wherein:

FIG. 8 is an elevational, cross-sectional view showing the bearing assembly in which the wheels of a trolley embodying the present invention are journaled;

FIG. 9 is an enlarged view of a portion of the bearing assembly shown in FIG. 8; and FIG. 10 is a cross-sectional view of the bearing assembly of FIG. 8 taken along the line 10—10 thereof.

DETAILED DESCRIPTION OF A PREFERRED EMBODIMENT OF THE INVENTION

Figure 1:
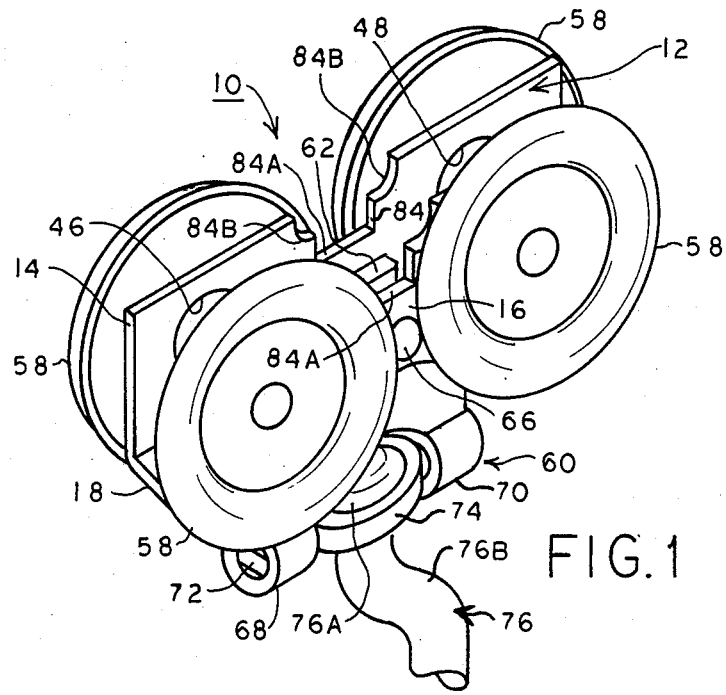
FIG. 1 is a perspective view of a trolley hanger assembly embodying the present invention.

Shown in FIG. 1 is a trolley assembly 10 including a generally u-shaped, rigid body 12. The body 12 is a steel channel member having a pair of upstanding parallel side flanges 14 and 16, and a web portion 18 disposed at the bottom extending between the side flanges. As shown best in FIG. 2, the web portion 18 includes a centrally located clearance hole 20 having longitudinally aligned notches or slots 22 and 24.

Referring to FIG. 1, the side flanges 14 and 16 of the body 12 are each provided with a pair of clearance holes 46 and 48. The holes 46 and 48 in flange 14 are respectively axially aligned with the holes 46 and 48 in the flange 16. A pair of bearing sleeves 50 and 52 are respectively retained in the sets of holes 46 and 48 and extend between the side flanges 14 and 16. A pair of axles 54 and 56 are journaled in the bearing sleeves 50 and 52 and a plurality of identical trolley wheels or rollers 58 are respectively secured to the ends of the axles 54 and 56 in any suitable manner such as by peening over the ends of the axles.

Figure 2:
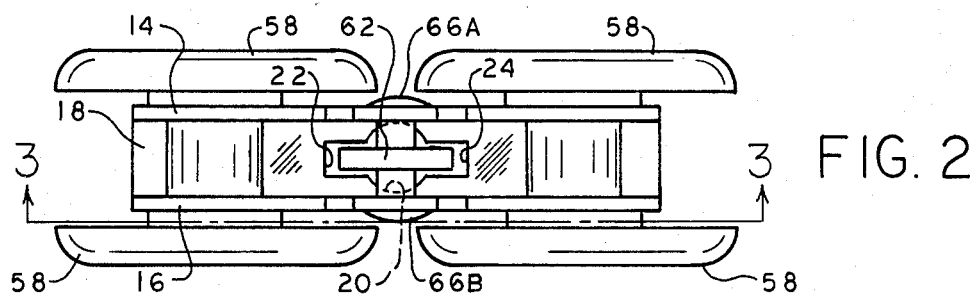
FIG. 2 is a top view of the trolley assembly of FIG. 1.
Figure 3:
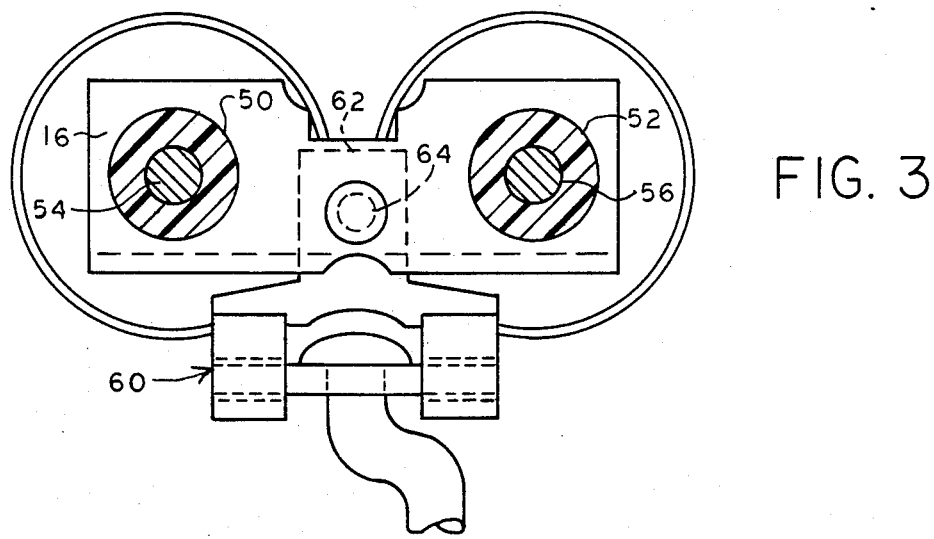
FIG. 3 is a cross-sectional view of the trolley assembly of FIG. 2 taken along the line 3—3 thereof.

A pivot yoke member 60 includes an upstanding ear 62 which loosely extends through the slot 20 into the notches 22 and 24 as shown in FIG. 2 and is provided with a hole 64 aligned with corresponding holes in the flanges 14 and 16 and through which a pintle 66 extends. As shown in FIG. 2, the pintle has head portions 66A and 66B which retain it in place in the body 12. Limited pivotal movement about the pintle 66 is thus provided.

The lower end of the yoke member 60 is provided with a pair of aligned integral bearing sleeve portions 68 and 70 which rotatably receive a pivot rod 72 having an annular central part 74 which rotatably supports a hanger rod 76 which is adapted to be connected to the associated door which hangs from the trolley 10. The rod has a head portion 76A and an offset portion 76B disposed a short distance beneath the head 76A for lateral adjustment of the position of the door in the conventional manner.

It may thus be seen that the hanger rod 76 and thus the door to which it is attached may be swung about the axis of the rod 72 and may be swung in the plane of the door about the axis of the pintle 66.

Figure 4:
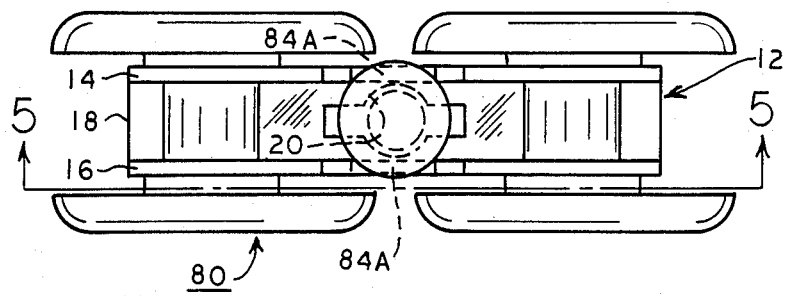
FIG. 4 is a top view of another trolley hanger embodying the present invention.
Figure 5:
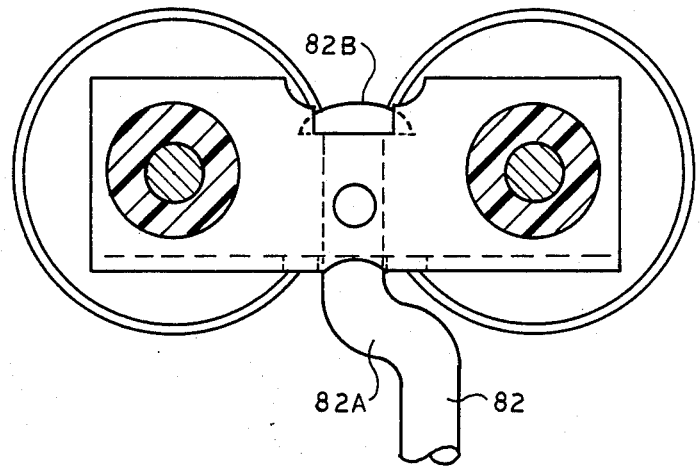
FIG. 5 is a cross-sectional view of the trolley hanger of FIG. 4 taken along the line 5—5 thereof.

Referring to FIGS. 4 and 5, there is shown a trolley assembly 80 which includes the same body, bearing assemblies and rollers as does the trolley 10. In the embodiment of FIGS. 4 and 5 those parts which correspond to the same parts in the trolley assembly 10 are identified by like reference characters. In the trolley assembly 10 a hanger rod 82 is provided with an offset portion 82A and a circular head 82B. The upper portion of the rod 82 extends through the circular opening 20 in the web 18 of the bod 12 and the head 82B extends into a pair of notches 84 (see FIG. 1) in the upper edges of the flanges 14 and 16 and rests on the edge surfaces 84A as shown in FIG. 4. It may thus be seen that the upper part of the rod 82 is rotatable in the body 12 so as to provide for lateral adjustment of the door in the usual manner. Unlike the trolley assembly 10, however, the rod is not pivotable relative to the trolley assembly.

Figure 6:
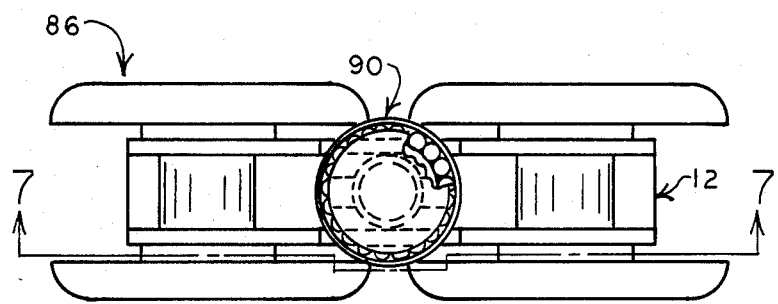
FIG. 6 is a top view of another trolley hanger embodying the present invention.
Figure 7:
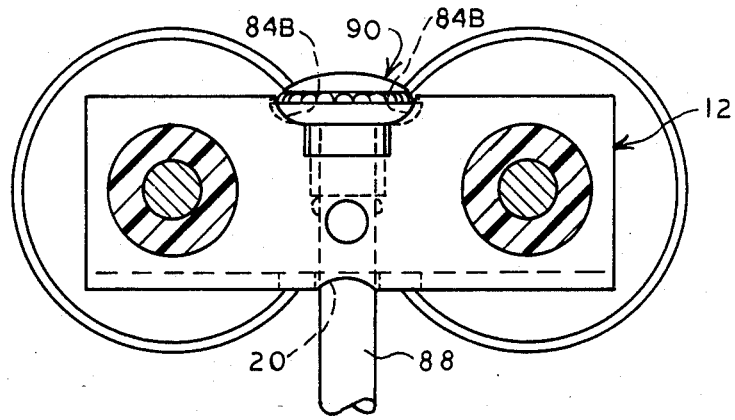
FIG. 7 is a cross-sectional view of the trolley hanger of FIG. 6 taken along the line 7—7 thereof.

Referring to FIGS. 6 and 7 there is shown a trolley assembly 86 which employs the same body 12 as does the trolley assemly 10 and is silmilar in construction to it. Like parts of the trolley assembly 86 and the trolley assembly 10 are identified in the drawings with like reference characters.

In the trolley assembly 10 a straight hanger rod 88 extends through the hole 20 in the web 18 of the body 12 and a ball bearing head assembly 90 is affixed to the top of the rod 88 and the outer race of the bearing assembly rests on arcuate edge portions 84B of the webs 14 and 16. In this embodiment of the invention the rod 88 is thus supported by the thrust ball bearing 90 and is rotatable about the axis of the hanger rod 88 to provide for lateral adjustment of the door in the normal manner.

In accordance with an important aspect of the present invention, there is provided a novel trolley assembly 100 which utilizes the body member 12, but which further utilizes a roller bearing assembly 102 for journaling the wheels 58 to the body 12. Each trolley assembly 100 includes two bearing assemblies 102 which are mutually identical, and only one of these assemblies is, therefore, described herein.

As shown in FIGS. 8 and 9, the bearing assembly 102 includes an outer race in the form of a longitudinally split tubular spring 104 that extends through and is retained in the aligned holes 46 and 48 in the flanges 14 and 16 by the outwardly directed radial force of the spring itself. The spring is compressed into the holes 46 and 48. The spring 104 is a tubular member made from spring steel and is provided with a generally V-shaped longidutinal slit (not shown). In the unstressed condition, the outside diameter of the spring 104 is slightly greater than the diameter of the holes 46 and 48, and the spring is installed in the body 12 by radially compressing the spring and then inserting the compressed spring into the aligned holes 46 and 48 until it is centrally positioned between the respective side flanges 14 and 16. The spring is retained in the holes by the outwardly directed radial spring force developed within the compressed spring itself. A plurality of needle bearings 106 are positioned against the inner cylindrical surface of the spring 104, and axle rod 108 is rotatably journaled in the needle bearings. The axle 108 passes through the bearings and has opposite free ends extending from the flanges 14 and 16 and to which the rollers 58 are respectively secured. It will be understood that a second axle is similarly journaled in the second bearing assembly.

Mounted between the ends of the spring 104 and the wheels 58 is a pair of identical spacers 110 each positioned between the exterior faces of the respective side flanges 14 and 16 and the wheels 58 which are fixedly attached to the end portions of the axle 108 outside of the spacers 110. The axle 108 may be seen to include a reduced diameter section 108A and a shoulder 108B against which the corresponding wheel 58 is abutted and retained by deforming the distal end of the axle over the outer surface of the wheel. Other means for attaching the wheel to the axle can readily be devised by those skilled in the art, and the invention is not to be considered limited to the attachment shown hereing.

The spacer 110, as best shown in FIGS. 8 and 9, is preferably formed of plastic and is provided with a central clearance hole 112 through which the axle extends. The spacer has a substantially flat outer face 114 adjacent the flat inner face 58A of the associated trolley wheel. The opposite face of the spacer, i.e., the inner face, is provided with an annular recess 116 into which the corresponding end of the spring 104 extends. The recess 116 defines a first annular portion 118 at the periphery 120 which limits axial movement of the needle bearings in the needle assembly, and has a thickness dimension such that a clearance space is maintained between the annular end of the portion 120 and the ends of the bearings when the first annular portion 118 is disposed against the side flange. The thickness of the spacer thereby assures appropriate axial end play of the axle and of the needle bearings to permit free rotation of the axle by spacing the spacer from the end of the spring 104. The spacer 110 may thus function as a thrust bearing in that the end surface of the flange 118 may ride against the outer face of the associated body flange in those cases where the wheel tends to move toward the body.

The bearing assembly 100 thus provides for reduced wear and greater load carrying capacity than the prior art bushing arrangements and is cost efficient to assemble during manufacture of the trolley assembly. The preferred embodiment has been described as employing two bearing assemblies and four trolley wheels with a hanger suspended from a channel shaped body symmetrically located between the respective axles and wheels. Other body and wheel arrangements contemplated to be within the scope of the invention are, for example, a single axle and one pair of bearing assemblies and wheels utilizing a shortened body.

In assemblying the trolley assembly 100, one of the trolley wheels and one of the end spacers may be assembled with the axle 108 to the needle bearings and the spring 104 before assembly thereof into the body 12. Where desired, however, the spring 104 may first be assembled to the body 12 and the axle and the needle bearing assembled to the spring thereafter.

While the present invention has been described in connection with particular embodiments thereof, it will be understood by those skilled in the art that many changes and modificatins may be made without departing from the true spirit and scope of the present invention. Therefore, it is intended by the appended claims to cover all such changes and modifications which come within the true spirit ad scope of this invention.

What is claimed:

1. A trolley assembly comprising:

a channel shaped body member having a web and side flanges;

first and second spaced apart openings in each of said flanges;

a first tubular spring liner positioned in said first openings in said side flanges;

a second tubular spring liner positioned in said second opernings in said side flanges;

a plurality of needle bearings disposed within each of said liners;

a first axle rotatably journaled in said needle bearings in said first liner;

a second axle rotatably journaled in said needle bearings in said second liner;

a first pair of trolley wheels attached to opposite ends of said second axle;

a second pair of trolley wheels attached to opposite ends of said second axle;

a first pair of spacers on said first axle respectively postioned between respective said side flanges of said body member and respective ones of said first pair of trolley wheels; and a second pair of spacers on said second axle respectively positioned between respective said side flanges of said body member and repective ones of said second pair of trolley wheels;

each of said spacers having an annular recess receiving one end of its associated said liner, a first annular portion extending into said one end of said liner for limiting the axial movement of said bearings in said liner and a second annular portion adapted to engage the adjacent flange to limit axial movement of said axle and to space said spacer from the end of said liner.

2. The trolley assembly as defined in claim 1 further comprising means for attaching a hanger to said body.

* * * * *